US010569628B2

(12) United States Patent
Oki

(10) Patent No.: US 10,569,628 B2
(45) Date of Patent: Feb. 25, 2020

(54) CONNECTING STRUCTURE BETWEEN A COWL LOUVER AND A WINDSHIELD

(71) Applicant: AGC Inc., Chiyoda-ku (JP)

(72) Inventor: Eiji Oki, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 86 days.

(21) Appl. No.: 15/944,884

(22) Filed: Apr. 4, 2018

(65) Prior Publication Data

US 2018/0297459 A1 Oct. 18, 2018

(30) Foreign Application Priority Data

Apr. 12, 2017 (JP) ................. 2017-078962

(51) Int. Cl.
| | |
|---|---|
| *B60J 10/70* | (2016.01) |
| *H05B 3/86* | (2006.01) |
| *B60J 10/33* | (2016.01) |
| *B60J 1/02* | (2006.01) |
| *B62D 25/08* | (2006.01) |
| *B60R 16/03* | (2006.01) |

(52) U.S. Cl.
CPC ............ *B60J 10/70* (2016.02); *B60J 1/02* (2013.01); *B60J 10/33* (2016.02); *B62D 25/081* (2013.01); *H05B 3/86* (2013.01); *B60R 16/03* (2013.01); *H05B 2203/013* (2013.01); *H05B 2203/016* (2013.01)

(58) Field of Classification Search
CPC ... B60J 10/70; B60J 10/33; B60J 1/02; B62D 25/081; H05B 3/86; H05B 2203/013; H05B 2203/016; B60R 16/03
See application file for complete search history.

(56) References Cited

U.S. PATENT DOCUMENTS

2017/0028832 A1* 2/2017 Sekishiro ................. B60J 10/70

FOREIGN PATENT DOCUMENTS

| JP | 63-025618 | 2/1988 |
|---|---|---|
| JP | 05-097061 | 4/1993 |
| JP | 2012-111385 | 6/2012 |
| JP | 2015-098264 | 5/2015 |

(Continued)

*Primary Examiner* — Lori L Lyjak
(74) *Attorney, Agent, or Firm* — Oblon, McClelland, Maier & Neustadt, L.L.P.

(57) ABSTRACT

A connecting structure between a cowl louver and a windshield includes a windshield including a laminated glass having a first glass plate disposed on an exterior side, a second glass plate disposed on an interior side and an interlayer bonding the first glass plate and the second glass plate; the laminated glass having a cutout portion formed by removing a part of the second glass plate and the interlayer at a certain area of a lower edge portion of the laminated glass; the first glass having a power feed portion disposed on an interior side surface thereof in the cutout portion; and a spacer disposed in the cutout portion on the lower edge side of the windshield closer than the power supply portion; the cowl louver including a clamping portion formed in a U-character shape in section at a rear end portion thereof, the clamping portion having an upper member disposed along the first glass plate and a lower member disposed so as to be close to the second glass plate; and the clamping portion clamps the first glass plate and the spacer.

9 Claims, 6 Drawing Sheets

(56) References Cited

FOREIGN PATENT DOCUMENTS

| | | |
|---|---|---|
| JP | 5859340 | 2/2016 |
| JP | 5917928 | 5/2016 |
| JP | 6211823 | 10/2017 |

* cited by examiner

US 10,569,628 B2

CONNECTING STRUCTURE BETWEEN A COWL LOUVER AND A WINDSHIELD

TECHNICAL FIELD

The present invention relates to a connecting structure between a cowl louver and a windshield.

BACKGROUND ART

With respect to a vehicle, there has been known a structure for connecting a rear end portion of a cowl louver and a lower edge portion of a windshield (see JP-A-H5-097061).

This Japanese publication discloses that a cowl louver has a clamping portion disposed on the rear end portion, and that the clamping portion includes a clamping edge portion and a plurality of clamping members disposed at certain intervals to clamp the lower edge portion of the windshield.

DISCLOSURE OF INVENTION

Technical Problem

In some cases, a windshield have a deicer or the like disposed therein to melt frost, snow, ice or the like adhering to the windshield. In such a windshield, an interior side glass plate of two glass plates forming the windshield has a cutout portion partly formed therein, and the exterior side glass plate has a power feed portion disposed on an interior side surface. The power feed portion is electrically connected to a power source disposed outside of the windshield by conductors. In order to seal the power feed portion and portions of the conductors, the cutout portion has a sealant filled therein.

When the sealant in the cutout portion has a greater thickness than the interior side glass plate, it is possible to more reliably protect a connection portion between the power feed portion and the conductors from entry of external moisture. In this case, the cowl louver could, however, fail to clamp the lower edge portion of a windshield by the clamping portion. In order to avoid this problem, the cowl louver needs to have the clamping portion disposed so as to avoid the cutout portion of the windshield. This leads to a decrease in the degree of freedom in design and a reduction in versatility with respect to cowl louvers.

In order to solve the above-mentioned problem, it is an object of the present invention to provide a connecting structure between a cowl louver and a windshield, which has a high degree of freedom in design and a high versatility with respect to cowl louvers.

Solution to Problem

According to one mode of the present invention, there is provided a connecting structure between a cowl louver and a windshield such that the cowl louver has a rear end portion connected to a lower edge portion of the windshield, the connecting structure including a windshield including a laminated glass having a first glass plate disposed on an exterior side, a second glass plate disposed on an interior side and an interlayer bonding the first glass plate and the second glass plate; the laminated glass having a cutout portion formed by removing a part of the second glass plate and the interlayer at a certain area of a lower edge portion of the laminated glass; the first glass having a power feed portion disposed on an interior side surface thereof in the cutout portion; and a spacer disposed in the cutout portion on a lower edge side of the windshield closer than the power feed portion; and the cowl louver including a clamping portion formed in a U-character shape in section at a rear end portion thereof, the clamping portion having an upper member disposed along the first glass plate and a lower member disposed so as to be close to the second glass plate; and the clamping portion clamps the first glass plate and the spacer.

Advantageous Effects of Invention

The connecting structure between a cowl louver and a windshield according to the present invention is capable of improving the degree of freedom in design and the versatility with respect to cowl louvers because the clamping portion of the cowl louver clamps the first glass plate and the spacer disposed in the cutout portion.

DESCRIPTION OF EMBODIMENTS

Figure 1:
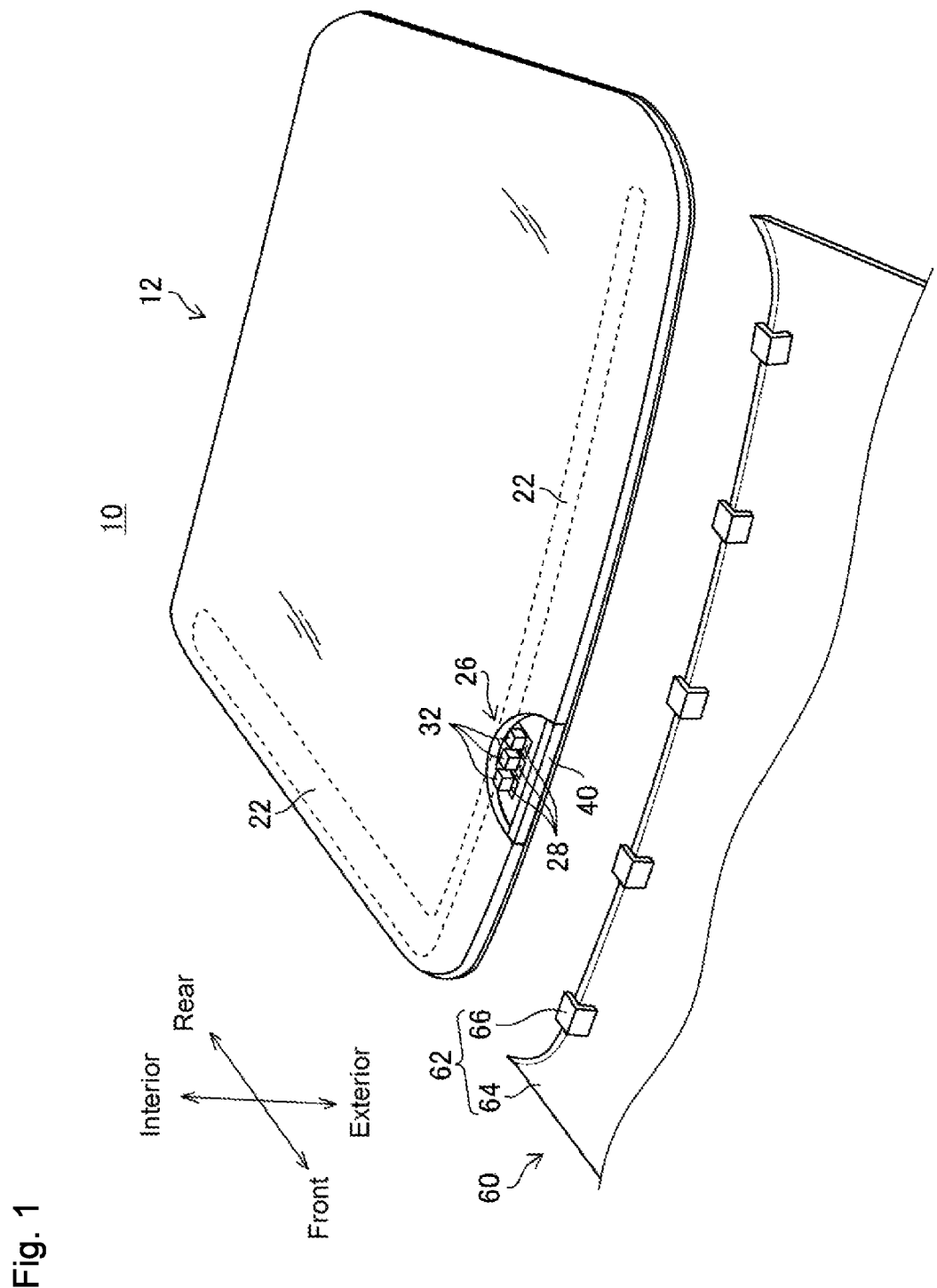
FIG. 1 is a perspective view showing how to assemble the connecting structure between a cowl louver and a windshield according to a first embodiment of the present invention.

Now, the present invention will be described based on embodiments of the present invention in reference to the accompanying drawings. It should be noted that numerous modifications and variations of the present invention are possible in light of the disclosure without departing from the scope of the present invention, and that the present invention may be practiced by other embodiments than the embodiments described below. From this point of view, any modifications within the scope of the present invention are included in the scope of the appended claims. In the drawings, portions or elements denoted by like references are basically similar portions or elements having similar functions.

First Embodiment

The connecting structure between a cowl louver and a windshield according to a first embodiment of the present invention will be described in reference to the accompanying drawings. FIG. 1 is a view showing a windshield 10 and a cowl louver 60 which are seen from an interior side.

In Description, the wordings "front", "rear", "upper", "lower", "interior" and "exterior" which indicate directions or positions mean positional relationships when the connecting structure between a cowl louver and a windshield is mounted to a vehicle.

As shown in FIG. 1, the cowl louver 60 has a rear end portion connected to a lower edge portion of the windshield 10. The windshield 10 includes a laminated glass 12; a cutout portion 26; electrodes 28, terminals 32 and a spacer 40 which are disposed in the cutout portion 26; and heating wires 22 for heating a lateral side portion and a lower side portion of the laminated glass. There is no particular limitation to the area where the heating wires 22 are disposed.

The laminated glass 12 is a laminated glass which includes a first glass plate disposed on an exterior side, a second glass plate disposed on an interior side, both glass plates being bonded through an interlayer.

The cowl louver 60 includes a clamping portion 62 at the rear end portion, which is defined by an upper member 64 disposed so as to extend along the first glass plate, and a plurality of lower members 66 disposed on a certain area of the cowl louver close to the second glass plate, and which is formed in a U-character shape in section. The clamping portion 62 clamps the windshield 10 by inserting the lower edge portion of the windshield 10 into openings defined by the upper member 64 and the lower members 66. The clamping portion 62 connects the windshield 10 and the cowl louver 60.

Figure 2:
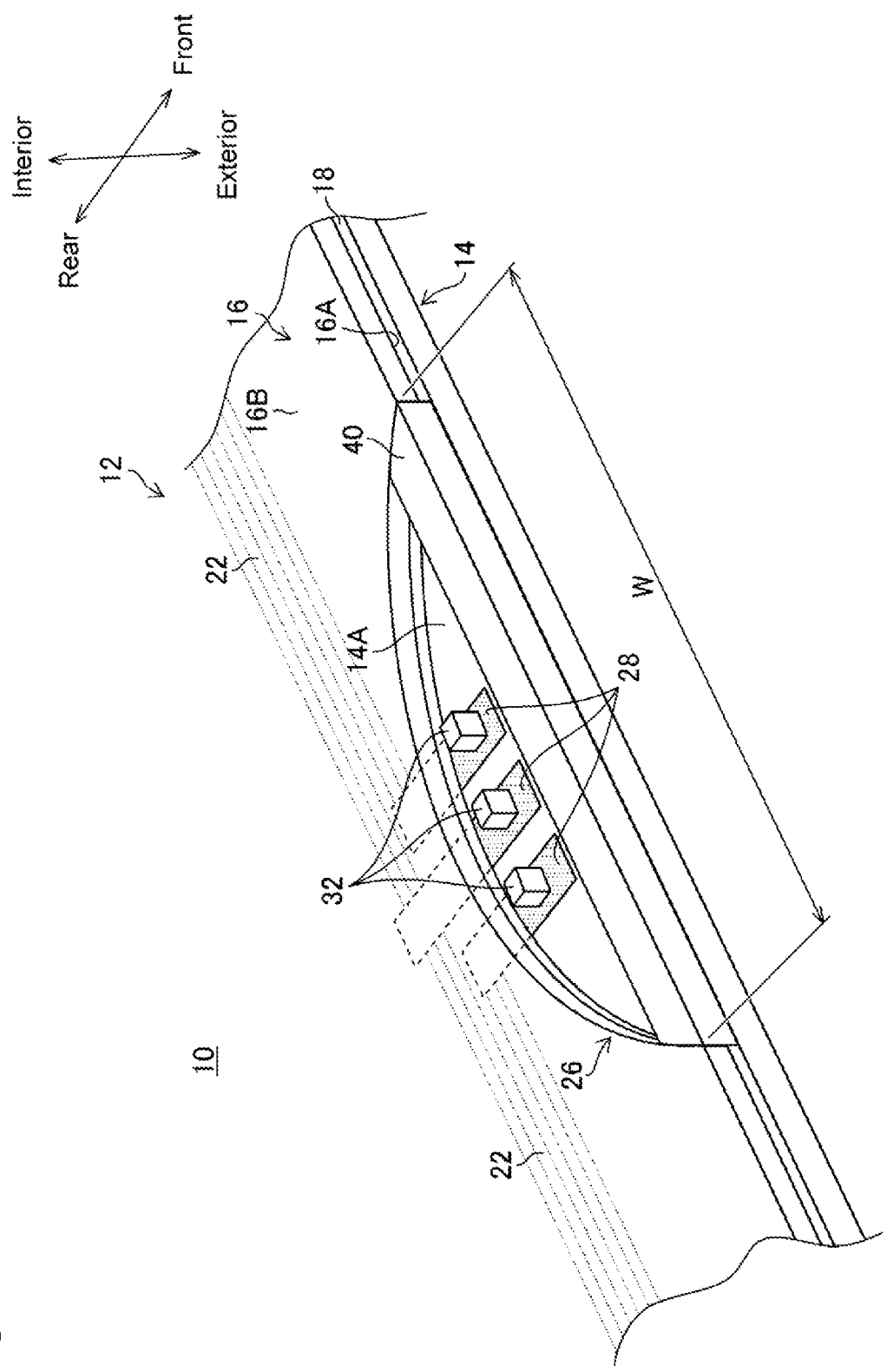
FIG. 2 is a perspective view showing, as an enlarged view, a cutout portion formed in the windshield, and surroundings of the cutout portion.

As shown in FIG. 2, the windshield 10 includes the laminated glass 12 which has the first glass plate 14 disposed on the exterior side, the second glass plate 16 disposed on the interior side, and the interlayer 18 bonding the first glass plate 14 and the second glass plate 16. As shown in FIG. 2, the first glass plate 14 has an interior side surface 14A, and the second glass plate 16 has an exterior side surface 16A such that the interior and exterior side surfaces are bonded together by the interlayer 18.

The interlayer 18 may be an interlayer made of PVB (Polyvinyl butyral) or an interlayer made of EVA (Ethylene-Vinyl Acetate).

As shown in FIG. 2, the heating wires 22 are disposed on the interior side surface 14A of the first glass plate 14. The heating wires 22 are made by a conductive material, such as metal. There is no particular limitation to the metal. The metal may be, for example, gold, silver, nickel, copper, aluminum, tin, cobalt, or an allow containing at least one of these elements. The heating wires 22 may be formed by baking conductive paste, such as metal paste.

As shown in FIG. 2, the windshield 10 has the cutout portion 26 formed in a certain area of the lower edge portion. The cutout portion 26 is an area where a portion of the interior side surface 14A of the first glass plate 14 is exposed by removing a portion of the second glass plate 16 and a portion of the interlayer 18.

The plural electrodes 28, which are electrically connected to the heating wires 22 to provide a power feed portion, are disposed on the interior side surface 14A in the cutout portion 26. The electrodes 28 may be formed by a similar process to the heating wires 22. In the first embodiment, the cutout portion 26 is formed in a substantially semi-circular shape such that the cutout portion has a length gradually increasing to a front end portion of the windshield. There is no particular limitation to the size or shape of the cutout portion 26 as long as the cutout portion is large enough to dispose the electrodes 28 in a required number.

The cutout portion 26 has the spacer 40 disposed therein on a position closer to the lower edge portion of the windshield than the electrodes 28. As shown in FIG. 2, the spacer is formed in a substantially cubic shape.

When the spacer 40 is disposed in the cutout portion 26, the spacer 40 functions as if the removed portion of the second glass plate 16 and the removed portion of the interlayer 18 are present. As described later, the lower edge portion of the windshield 10 can be clamped by the clamping portion 62 of the cowl louver 60 as in a certain area where the second glass plate 16 and the interlayer 18 are present.

The spacer 40 has a width W in a direction orthogonal to a front and rear direction of the windshield, which is preferably determined to be a length such that the spacer 40 has both end portions brought into contact with the second glass plate 16 and the interlayer 18.

Now, explanation will be made about the connecting structure between the cowl louver 60 and the windshield 10.

Figure 3:
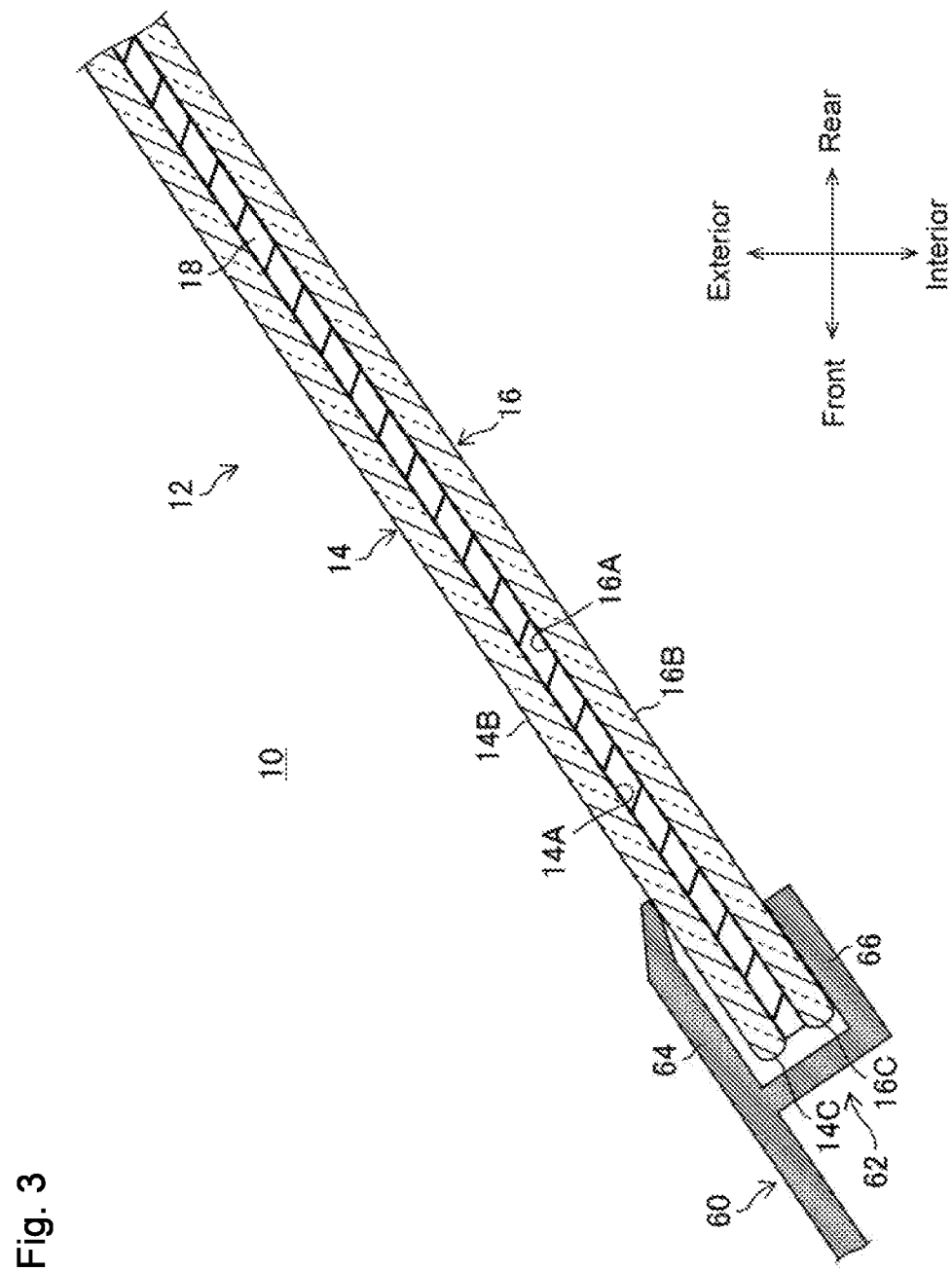
FIG. 3 is an enlarged sectional view showing the connecting structure except for the area where the cutout portion is formed.

As shown in FIG. 3, the clamping portion 62 clamps the lower edge portion of the windshield 10 at the rear end portion of the cowl louver 60. When a portion of the windshield 10 except for the cutout portion 26 is inserted into the openings defined by the upper member 64 and the lower member 66, the upper member 64 is brought into contact with an exterior side surface 14B of the first glass plate 14 while the lower member 66 are brought into contact with an interior side surface 16B of the second glass plate 16. Thus, the clamping portion 62, which includes the upper member 64 and lower member 66, pinches the lower edge portion of the windshield 10. When each of the openings of the clamping portion 62 has a width set to be smaller than the thickness of the laminated glass 12, it is possible to increase the clamping force of the clamping portion 62 applied to the windshield 10.

It is preferred from the viewpoint of avoiding the formation of e.g. a conchoidal chip on a cut surface of a glass plate and of securing the safety in handling a windshield 10 by a worker that the first glass plate 14 and the second glass plate 16 have a front end portion 14C and a front end portion 16C formed in a curved shape (chamfered), respectively.

Figure 4:
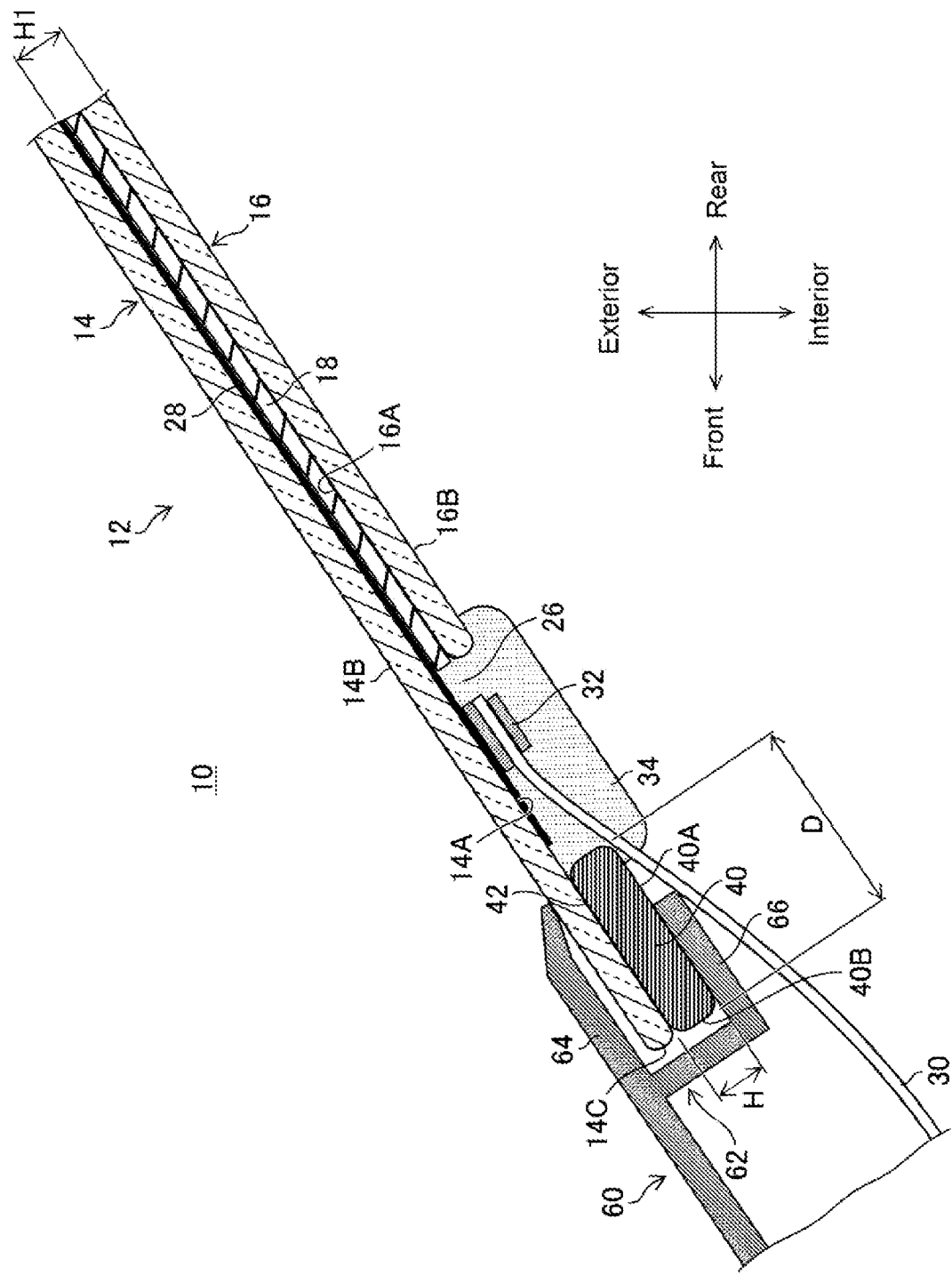
FIG. 4 is an enlarged sectional view showing the connecting structure at the area where the cutout portion is formed.

As shown in FIG. 4, the electrodes 28 are disposed on the interior side surface 14A of the first glass plate 14 in the cutout portion 26. The electrodes 28 are electrically connected to the heating wires 22. The conductors 30 are connected to the electrodes 28 through the terminals 32. The terminals 32 are connected to the electrodes 28 by soldering.

As shown in FIG. 4, when the cutout portion 26 of the windshield 10 is inserted into the openings defined by the upper member 64 and the lower member 66, the upper member 64 is brought into contact with the exterior side surface 14B of the first glass plate 14 while the lower member 66 are brought into contact with the spacer 40 at its top surface portion 40A. Since the spacer functions as if the removed portion of the second glass plate 16 and the removed portion of the interlayer 18 are present, the clamping portion 62 can clamp, at the lower edge portion of the cowl louver 60, a certain area of the windshield 10 where the cutout portion 26 is formed in the lower edge portion.

The spacer 40 has a height H reaching the top surface portion 40A, which is equal to a height H1 of the second glass plate 16 reaching the interior side surface 16B on the basis of the interior side surface 14A of the first glass plate 14. From this point of view, the top surface portion 40A of the spacer 40 and the interior side surface 16B of the second glass plate 16 at the lower edge portion of the windshield 10 are preferred to be substantially flush with each other (form a substantially common plane).

In the first embodiment, the spacer 40 and the first glass plate 14 may be bonded together by e.g. a double-sided adhesive tape 42. There is no particular limitation to the bonding method as long as the spacer 40 and the first glass plate 14 can be bonded together with the top surface portion 40A of the spacer 40 and the interior side surface 16B of the second glass plate 16 having a substantially common plane each other.

Preferably, a front end portion 40B of the spacer 40 and a front end portion 14C of the first glass plate 14 are flush with each other. The word "flush with" means "apparently flush with", "completely flush with" or "substantially flush with". The spacer 40 can protect the front end portion 14C of the first glass plate 14 to prevent the first glass plate 14 from being cracked or chipped. Further, it is easy to insert the lower edge portion of the windshield 10 into the clamping portion 62.

Preferably, the shape on the interior side of the front end portion 40B of the spacer 40 is the same shape as the shape on the interior side of the front end portion 16C of the second glass plate 16 (see FIG. 3). When the interior side surfaces of both front end portions are formed in the same shape, it is possible to reliably insert the windshield 10 into the clamping portion 62 at any position of the lower edge portion of the windshield 10. The wording "the same shape" means "exactly the same shape" or "substantially the same shape". The front end portion 40B of the spacer 40 is preferably formed in a curved shape as in the front end portion 16C of the second glass plate 16. Thus, it is easy to insert the windshield 10 into the clamping portion 62.

It is sufficient that the spacer 40 has a depth D in the front and rear direction such that the spacer 40 is clamped by tip portion of the lower member 66 of the clamping portion 62. Although the front end portion 14C of the first glass plate 14 is preferably flush with the front end portion 40B of the space 40, the former may fail to be flush with the latter.

The spacer 40 is preferably made of a material selected from a group comprising of a synthetic resin, metal, glass and rubber. The synthetic resin is preferred to be a TPE (thermoplastic elastomer) resin. When a TPE resin is used, the TPE resin has a shore hardness of preferably at least Hs70. Thus, the spacer 40 is prevented from being deformed by a lower member 66 when the windshield 10 is inserted into the clamping portion 62. The spacer 40 may, however, be made of a different material or have a different shore hardness.

In the first embodiment, a sealant 34 is filled between the spacer 40 and a combination of the second glass plate 16 and the interlayer 18 in the cutout portion 26. The sealant 34 may be, for example, a silicone resin. The sealant 34 seals and protects a portion of each conductor 30, the electrodes 28 and the terminals 32.

Next, explanation will be made about a modification of the first embodiment in reference to FIG. 5. Portions or elements similar to those of the first embodiment are denoted by like references, and explanation about these portions or elements will be omitted.

Figure 5:
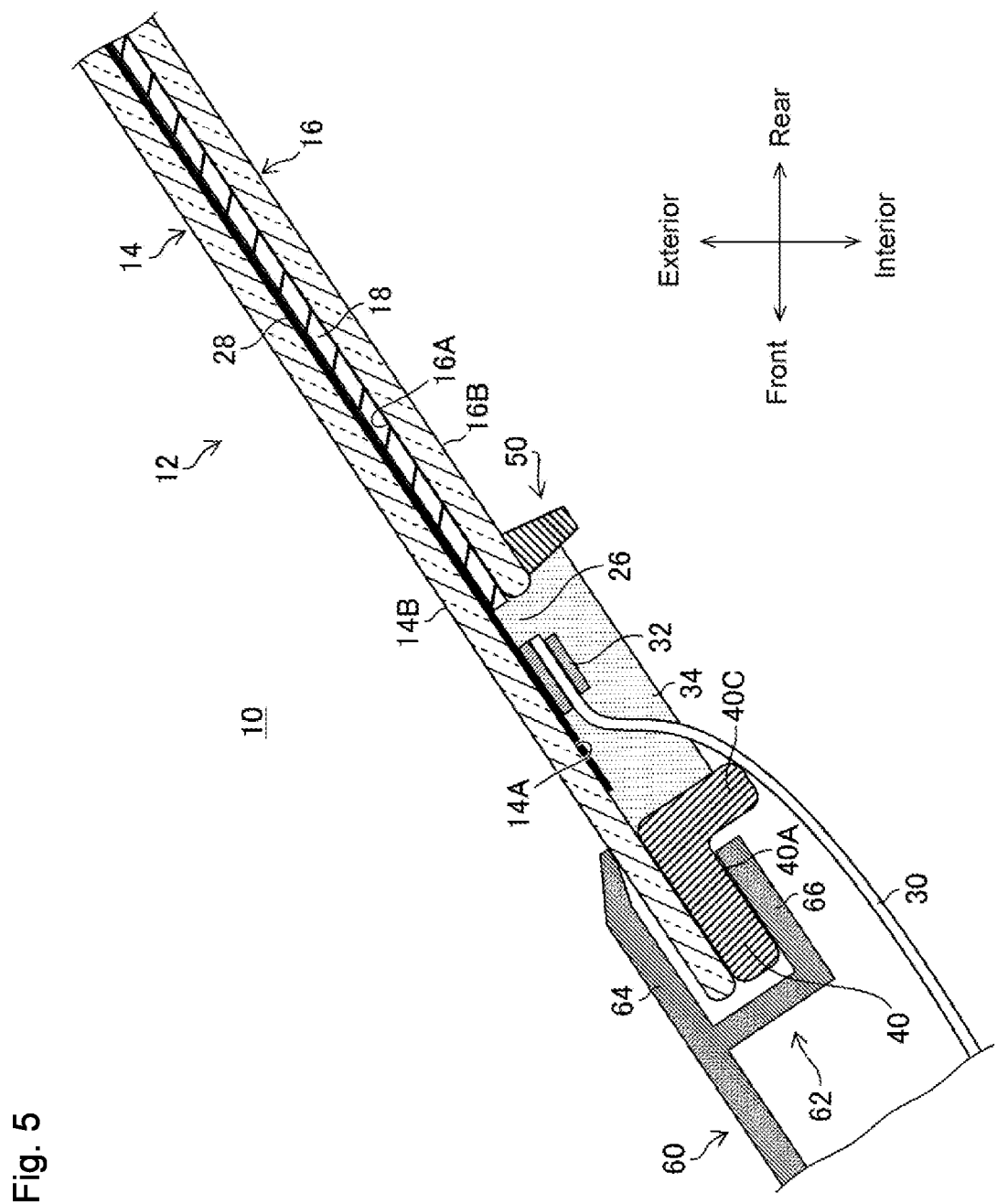
FIG. 5 is an enlarged sectional view showing the connecting structure at the area where the cutout portion is formed, according to a modification of the first embodiment.

As shown in FIG. 5, the cutout portion 26 of the windshield 10 is inserted into the openings defined by the upper member 64 and the lower member 66, the upper member 64 is brought into contact with the exterior side surface 14B of the first glass plate 14 while the lower member 66 is brought into contact with the top surface portion 40A flush with the interior side surface 16B of the second glass plate 16. Thus, the clamping portion 62 clamps the first glass plate 14 and the spacer 40.

In the modification of the first embodiment, the second glass plate 16 has a dam 50 disposed on the interior side surface 16B around the cutout portion 26. Further, the spacer 40 is formed in an L-character shape as seen in section such that the spacer 40 has a protruding portion 40C protruding toward the interior side in comparison with the top surface portion 40A at a portion that is not clamped by the lower member 66.

Since the dam 50 and the L-character shape of spacer 40 prevent the sealant 34 from flowing out, the modification of the first embodiment allows the sealant 34 to be filled in a greater amount in comparison with the first embodiment. When the sealant 34 is filled in a greater amount, it is possible to more reliably protect the relevant portion of each conductor 30, the electrodes 28 and the terminals 32. Further, it is possible to lead out the conductors 30 beyond the protruding portion 40C because of the presence of the L-character shape of spacer 40. Thus, the spacer 40 prevents the clamping portion 62 from nipping a conductors 30.

There is no limitation to the shape of the spacer as long as the spacer 40 has the protruding portion 40C protruding toward the interior side in comparison with the top surface portion 40A at such a portion that is not clamped by the lower member 66. The spacer 40 may be, for example, formed in a T-character shape.

Second Embodiment

The connecting structure between a cowl louver and a windshield according to a second embodiment will be described in reference to FIG. 6. Portions or elements similar to those of the connecting structure between a cowl louver and a windshield according to the first embodiment are denoted by like references, and explanation of these portions or elements may be omitted.

Figure 6:
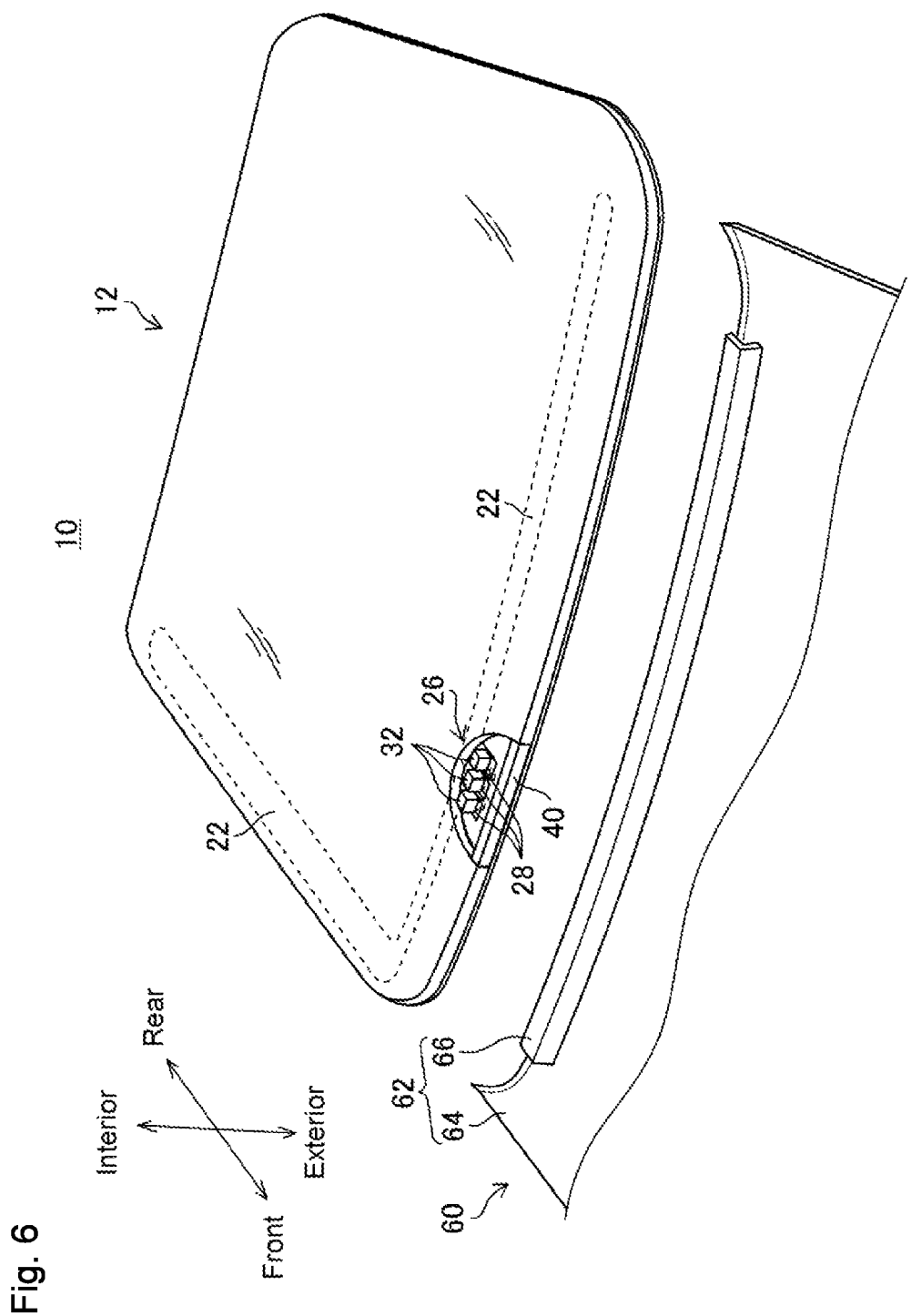
FIG. 6 is a perspective view showing how to assemble the connecting structure between a cowl louver and a windshield according to a second embodiment of the present invention.

As shown in FIG. 6, a cowl louver 60 has a rear end portion connected to a lower edge portion of a windshield 10. The windshield 10 includes a laminated glass 12; a cutout portion 26; electrodes 28, terminals 32 and a spacer 40 which are disposed in the cutout portion 26; and heating wires 22 for heating a lateral side portion and a lower side portion of the laminated glass.

The windshield 10 with the cowl louver according to the second embodiment is different from the connecting structure between the cowl louver 60 and the windshield 10 according to the first embodiment in that the cowl louver 60 of the former has a clamping portion formed with a lower member 66 formed in a different shape from that of the first embodiment.

The cowl louver 60 includes the clamping portion 62 formed in a U-character shape in section at the rear end portion, which is defined by an upper member 64 disposed so as to extend along a first glass plate 14, and the lower member 66 disposed so as to extend along a second glass plate 16. The lower member 66 is formed so as to continuously extend in the width direction of the cowl louver 60.

In the second embodiment, the entire clamping portion 62 clamps the lower edge portion of the windshield 10 (a certain area of the lower edge portion where the cutout portion 26 is formed, and a certain area of the lower edge portion where the cutout portion 26 is not formed). Since the lower member 66 is formed so as to have a continuous length, it is possible to more effectively prevent moisture from entering the interior side.

The entire disclosure of Japanese Patent Application No. 2017-078962 filed on Apr. 12, 2017 including specification, claims, drawings and summary is incorporated herein by reference in its entirety.

What is claimed is:

1. A connecting structure between a cowl louver and a windshield such that the cowl louver has a rear end portion connected to a lower edge portion of the windshield, comprising:
    a windshield including:
        a laminated glass having a first glass plate disposed on an exterior side, a second glass plate disposed on an interior side and an interlayer bonding the first glass plate and the second glass plate;
        the laminated glass having a cutout portion formed by removing a part of the second glass plate and the interlayer at a certain area of a lower edge portion of the laminated glass;
        the first glass having a power feed portion disposed on an interior side surface thereof in the cutout portion;
        a spacer disposed in the cutout portion on a lower edge side of the windshield closer than the power feed portion; and
    the cowl louver including a clamping portion formed in a U-character shape in section at a rear end portion thereof, the clamping portion having an upper member disposed along the first glass plate and a lower member disposed so as to be close to the second glass plate; and
    the clamping portion clamps the first glass plate and the spacer.

2. The connecting structure according to claim 1, wherein the spacer is clamped by a tip portion of the lower member of the claiming portion.

3. The connecting structure according to claim 1, wherein a front end portion of the spacer and a front end portion of the first glass plate are flush with each other.

4. The connecting structure according to claim 1, wherein the spacer is made of a material selected from a group comprising a synthetic resin, metal, glass and rubber.

5. The connecting structure according to claim 1, wherein the cutout portion has a sealant therein to seal the power feed portion.

6. The connecting structure according to claim 1, wherein the spacer has a protruding portion protruding toward the interior side in comparison with the top surface portion at a portion that is not clamped by the lower member.

7. The connecting structure according to claim 1, wherein the lower member is disposed along the second glass plate.

8. The connecting structure according to claim 1, wherein the shape on the interior side of the front end portion of the spacer is the same shape as the shape on the interior side of the front end portion of the second glass plate except for the cutout portion.

9. The connecting structure according to claim 8, wherein the front end portion of the spacer has the interior side surface formed in a curved shape.

* * * * *